July 16, 1963   R. C. VICKERY   3,097,714
FORCE MEASURING DEVICE
Filed May 25, 1961
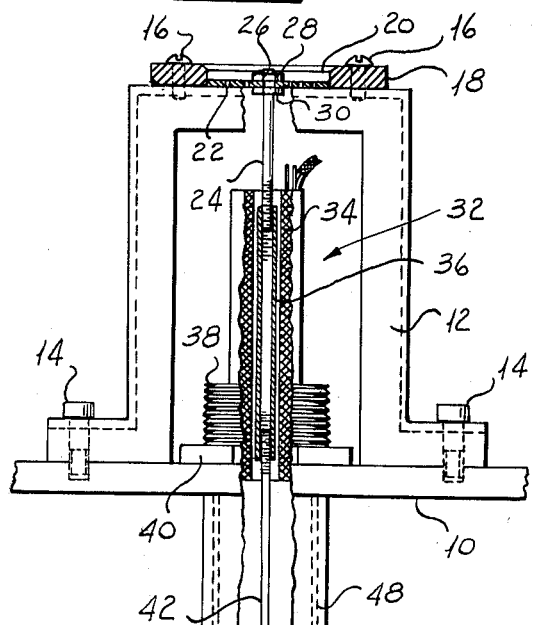
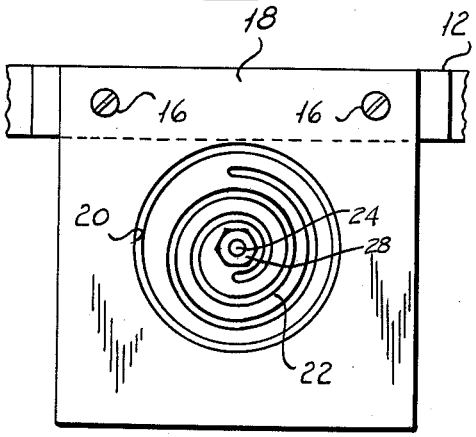
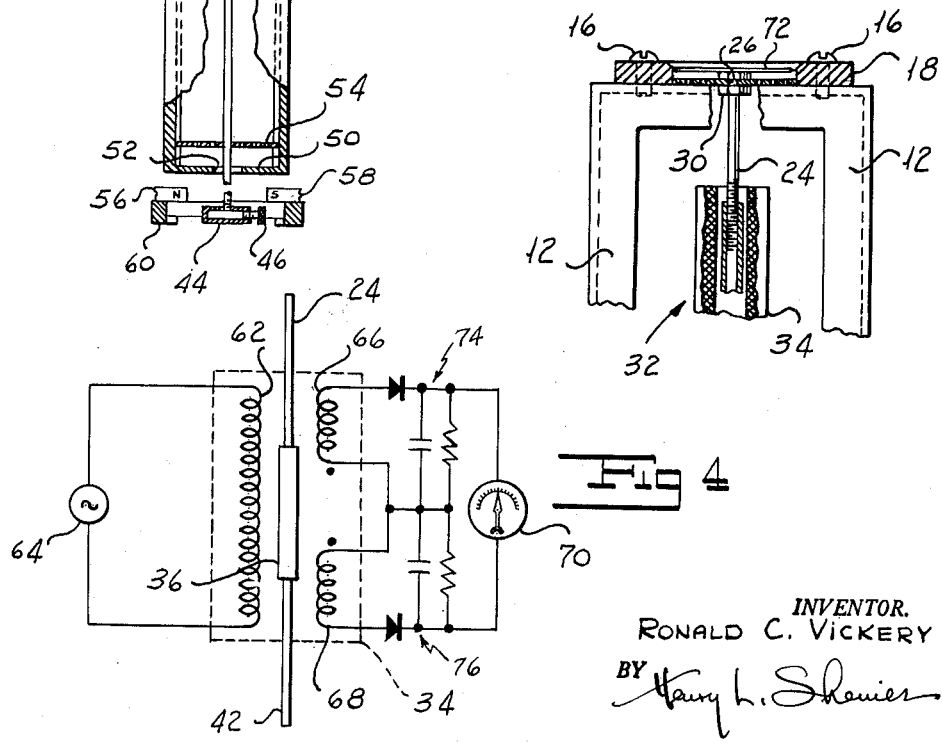
INVENTOR.
RONALD C. VICKERY
BY *Harry L. Shenier*
ATTORNEY

3,097,714
FORCE MEASURING DEVICE
Ronald C. Vickery, Malibu, Calif., assignor to Nuclear Corporation of America, Denville, N.J., a corporation of Delaware
Filed May 25, 1961, Ser. No. 112,621
6 Claims. (Cl. 177—210)

My invention relates to a balance and more particularly to an improved balance which is highly accurate and which is more simple and expeditious to use than are balances known in the prior art.

In measuring magnetic susceptance of samples in the prior art, the usual method is to position the sample at the location at which it is subjected to the magnetic field and to measure the displacement of the sample under the influence of the magnetic field as a measure of its magnetic susceptance. In performing these measurements it is necessary that the displacement of the sample in the magnetic field be kept small if accurate results are to be achieved. That is, since the gradient of the field in a direction perpendicular to the lines of force changes relatively rapidly an appreciable displacement will result in an erroneous indication of the susceptibility of the sample.

In efforts to overcome the difficulty in measuring susceptance in the prior art, systems have been devised in which a restoring force is used to reposition the sample which was displaced in response to the effect of the magnetic field. Devices of this nature embody the defect that they operate on the assumption that the device which produces the restoring force is itself linear in nature which usually is not the case.

In a particular system devised in the prior art, to afford an accurate measure of magnetic susceptance, a Sucksmith balance is employed to multiply small mechanical displacements resulting from the action of the magnetic field on the sample. With this system a readable or sensible indication of susceptance can be produced without requiring such appreciable displacement of the sample such as would introduce inaccuracies into the results achieved. The Sucksmith balance depends for its operation on the deformation of a circular ring fixed at the top and subjected at the bottom to the force to be measured. This force may be that produced by a magnetic field on a sample hung from the end of a wire secured to the bottom of a ring. In response to this force the ring is distorted and a light beam directed onto a mirror carried on the ring at a point of maximum distortion and reflected to a second mirror secured to the ring at another point of maximum distortion is deflected through an angle proportional to the force producing the distortion. The deflected light beam impinges on a suitable scale to indicate the force producing the distortion of the ring. Thus, a sensible indication of the force producing the displacement is obtained without requiring appreciable displacement of the sample in the field.

While the Sucksmith balance described above successfully achieves the result of producing a sensible indication of the magnitude of a force without requiring appreciable mechanical displacement, it is a delicate and sensitive mechanism embodying a number of defects. First, it is extremely sensitive to vibration particularly in the horizontal plane and it thus requires very careful operation in an atmosphere which is substantially free from vibration. Secondly, the optical system employed to sense distortion of the Sucksmith ring becomes misaligned with relative ease and thus must be carefully set up and handled if errors are to be avoided.

Mass measuring devices known in the prior art fall into two categories. First, there are spring devices requiring an appreciable displacement of the mass to produce a sensible indication of the magnitude of the mass. These devices are notoriously nonlinear. Secondly, there are mechanical mass measuring balances in the prior art which employ counterweights to restore the measured mass carrier to its neutral position. While this latter type of mass measuring device is relatively accurate as compared with a spring balance system, it is inconvenient to use in that various weights require that the balance must be stored and must be handled in the course of making a measurement.

I have invented an improved balance which is more rugged and more convenient to use than the Sucksmith balance referred to above while being equally as sensitive and as accurate as the Sucksmith balance. My improved balance is relatively insensitive to vibrations. It employs no optical sensing system which may become misaligned.

My improved balance accurately measures masses without requiring counterweights such as must be employed in accurate mass measuring balances of the prior art.

One object of my invention is to provide an improved balance of high accuracy which is simple and expeditious to use.

A further object of my invention is to provide an improved accurate balance which is more rugged than are accurate balances of the prior art.

Another object of my invention is to provide an improved balance which is highly accurate while being relatively insensitive to extraneous vibrations.

A further object of my invention is to provide an improved balance which does not employ an easily misaligned optical sensing system.

A still further object of my invention is to provide an improved balance which produces a sensible indication of a very small mechanical displacement in response to the force being measured.

Other and further objects of my invention will appear from the following description.

In general my invention contemplates the provision of an improved balance in which a rod to which the force to be measured is applied is supported by a pair of spaced flat spiral springs which resist any horizontal movement of the rod while permitting vertical displacement thereof. My balance includes a differential electrical device, highly sensitive to minute displacements of the rod in a vertical direction, to afford an indication of the force producing the displacement.

In the accompanying drawings which form part of the instant specification and which are to be read in conjunction therewith and in which like reference numerals are used to indicate like parts in the various views:

FIGURE 1 is an elevation of a form of my improved balance adapted to measure magnetic susceptibility with parts broken away and with other parts shown in section.

FIGURE 2 is a fragmentary top plan view of my improved balance.

FIGURE 3 is a fragmentary elevation of an alternate form of my improved balance adapted to measure mass with parts broken away and with other parts shown in section.

FIGURE 4 is a schematic view of the electrical circuit of the differential device employed in my improved balance.

Referring now to FIGURES 1 and 2 of the drawings, one form of my improved balance adapted to measure magnetic susceptance includes a plate 10 to which I secure the upright 12 of a gallows support by means of screws 14 or the like. I employ screws 16 to secure the horizontally extending gallows support 18 to the upright 12. Support 18 is formed with a circular opening or bore 20 adapted to receive a flat spiral spring 22 which frictionally fits in the bore 20. The particular spring 22 which I have illustrated in the drawings may, for example, be two-and-one-half turns of 0.01 inch thick Phosphor bronze. It is expeditiously prepared by the use of photo-etching techniques and several spirals of the material can be stacked to provide variable sensitivity for the balance. My balance includes a brass screw 24 which passes through an opening 26 in the center of the spring 22 to which the rod is secured by a pair of nuts 28 and 30 which permit the vertical position of the rod to be adjusted.

The transducer or differential electrical sensor, indicated generally by the reference character 32, of my balance includes a body 34 comprising the primary and secondary windings of the transducer to be described in detail hereinafter. Transducer 32 has a hollow core 36 formed of a suitable magnetic material. I thread the lower end of the brass rod 24 as viewed in FIGURE 1 into the upper end of the core 36 thus to suspend the core from the spring 22. I mount the transducer body 34 on the support plate 10 by any suitable means such as by means of a screw 38 carried by the body 34 and threaded into a nut 40 supported on the plate 10. I thread the upper end of a rod 42 into the lower end of core 36 as viewed in FIGURE 1. The lower end of the rod 42 remote from the core 36 carries a sample holder 44 screwed onto the end of the rod. The sample holder 44 may be formed from any suitable non-magnetic material such as tantalum or the like. An appropriate form of this carrier 44 is that of a hollow cylinder having a removable plug 46 in one end thereof which permits the sample to be placed in the carrier and to be removed therefrom. The rod 42 extends downwardly from the core 36 through the inside of a hollow cylindrical guide 48 having a base 50 formed with an opening 52 through which the rod extends to the carrier 44. The inside of the guide 48 slidably receives a spiral spring 54 which is cemented to the rod 42 by any suitable means such as by an epoxy resin cement. This spring 54 may be similar to the spring 22. It resists lateral movement of the rod while at the same time permitting vertical movement thereof.

In the form of my invention shown in FIGURE 1 the sample carrier 44 is adapted to be positioned in a magnetic field which causes a sample of magnetic material to be positioned at the point of maximum intensity of the field. For purposes of illustration in FIGURE 1 of the drawings I have indicated the field schematically as that which would be produced by a pair of magnetic poles 56 and 58 carried by a suitable support 60. It will be appreciated that when a sample of magnetic material is placed in the carrier 44 it tends to align itself with the position of maximum intensity in the field thus displacing the core 36 vertically with respect to the body 34 of the differential device 32. If, on the other hand, the sample is diamagnetic, it tends to move away from the point of maximum intensity of the field.

Referring now to FIGURE 4 of the drawings, one form of electrical circuit in which my balance may be employed includes the body 34 which I have indicated in broken lines in FIGURE 4. This body includes a primary winding 62 connected across a suitable source 64 of alternating current voltage. Body 34 comprises respective secondary windings 66 and 68. Respective filter networks 74 and 76 rectify the signals of windings 66 and 68 and apply them to the terminals of a suitable zero center meter 70. As can be seen by the polarities indicated in FIGURE 4 I connect the windings 66 and 68 in series-opposed relationship. Core 36 is mounted for vertical movement with reference to the windings making up to the body 34. With the core 36 disposed in a neutral position with respect to the windings, equal voltages are induced in the secondary windings 66 and 68 in response to the signal from source 64. When, however, the core 36 is displaced from this null for neutral position then a greater voltage is induced in one of the windings and meter 70 produces an indication of this voltage.

As has been pointed out hereinabove my balance is adapted not only to measure magnetic susceptance but also it may be used to measure masses. Referring now to FIGURE 3, in a form of my invention adapted to measure masses I secure a pan 72 to the upper end of the rod 24 by any suitable means such as by welding or brazing. Weights, the mass of which is to be measured, are placed on the pan 72 to displace core 36 vertically with respect to the windings of the differential device 32.

In operation of the form of my invention shown in FIGURE 1 with no sample in the carrier 44 I manipulate the nuts 28 and 30 to position the core 36 with respect to the windings 62, 66 and 68 so that meter 70 indicates substantially zero voltage. When this has been done and the susceptibility of a sample is to be determined, I remove the plug 46 from the carrier 44 and place the sample within the carrier. Plug 46 is then replaced and the sample is subjected to the magnetic field between poles 56 and 58. Under the influence of the magnetic field the sample and the carrier 44 which holds the sample tend to move vertically to a position at which spring 22 counterbalances the force of the magnetic field. Owing to the fact that my differential device 32 is sensitive to very small mechanical displacements I am able to employ a relatively stiff spring 22. In response to the movement of the carrier 44 under the influence of the magnetic field core 36 is displaced with respect to the windings 62, 66, and 68 to cause the secondary windings to produce an output voltage, the phase of which indicates the direction of the displacement and the magnitude of which indicates the amount of the displacement. Owing to the fact that, in response to diplacement of the sample, the voltage of one secondary winding increases and the voltage of the other secondary winding decreases and the meter 70 produces an indication of the difference between the voltages, a very small mechanical displacement of the core produces a significant difference voltage which is a measure of the displacement.

While the spring 22 permits vertical movement of the core it prevents lateral movement so that vibrations in the horizontal plane do not appreciably affect the result obtained. In order to minimize the effect of vertical vibrations I employ a high inertia low frequency meter 70. This meter is insensitive to the relatively rapid voltage changes which are generated in response to the high frequency vibrations. It will be appreciated that before being used to measure susceptance or to measure weight my balance is calibrated by use of samples or masses of known properties.

In use of the form of my invention shown in FIGURE 3 the sample whose mass is to be determined is placed on the pan 72 and meter 70 produces an indication of the mass of the sample.

It will be seen that I have accomplished the objects of my invention. I have provided a balance for determining magnetic susceptances which is more rugged than are balances of the prior art while being just as sensitive as those balances. My balance is relatively insensitive to vibrations. It requires only a very small displacement of the sample so that a restoring force to counteract a relatively large displacement is not necessary. In use as a mass balance my device does not require the use of weights such as are required in sensitive mass balances of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A force measuring device including in combination a member to which the force to be measured is applied, a support, a spiral spring carried by said support, means for securing said member to said spiral spring to permit movement of said member in the direction of the axis of the spring spiral while restraining said member against movement in a direction generally perpendicular to the spiral axis, means for applying the force to be measured to said member in the direction of the spiral axis and means responsive to minute displacements of said member in the direction of the spiral axis under the influence of said force for indicating said force.

2. A force measuring device including in combination a member to which the force to be measured is applied, a support, a first spiral spring carried by said support, means for securing said member to said first spiral spring to permit movement of said member in the direction of the axis of the spring spiral while restraining said member against movement in a direction generally perpendicular to the spiral axis, a second spiral spring, means for aligning the axis of said second spiral spring with said first spiral axis, means for securing said second spiral spring to said member in spaced relationship to said first spring, means for applying the force to be measured to said member in the direction of the spiral axis and means responsive to minute displacements of said member in the direction of the spiral axis under the influence of said force for indicating said force.

3. A force measuring device including in combination a member to which the force to be measured is applied, a support, a spiral spring carried by said support, means for securing said member to said spiral spring to permit movement of said member in the direction of the axis of the spring while restraining said member against movement in a direction generally perpendicular to the spiral axis, means for applying the force to be measured to said member in the direction of the spiral axis, means responsive to minute displacements of said member in the direction of the spiral axis under the influence of said force for indicating said force and a sample carrier supported by said member.

4. A force measuring device including in combination a member to which the force to be measured is applied, a support, a spiral spring carried by said support, means for securing said member to said spiral spring to permit movement of said member in the direction of the axis of the spring while restraining said member against movement in a direction generally perpendicular to the spiral axis, means for applying the force to be measured to said member in the direction of the spiral axis, means responsive to minute displacements of said member in the direction of spiral axis under the influence of said force for indicating said force and a scale pan carried by said member.

5. A balance for measuring the magnetic susceptance of materials including in combination a differential transformer comprising a primary winding and series opposed secondary windings and an elongated core, a support, a flat spiral spring carried by said support, means for securing said core to said spring to permit movement of said core in one direction with respect to said support while restraining said core against movement in a direction generally perpendicular to said one direction, a sample carrier adapted to be subjected to the influence of a magnetic field and means for securing said sample carrier to the end of said core remote from said spring.

6. A balance for measuring the magnetic susceptance of materials including in combination a differential transformer comprising a primary winding and series opposed secondary windings and an elongated core, a support, a first flat spiral spring carried by said support, means for securing said core to said first spring to permit movement of said core in one direction with respect to said support while restraining said core against movement in a direction generally perpendicular to said one direction, a second flat spiral spring for assisting said first spring in restraining said core against movement in a direction generally perpendicular to said one direction, a sample carrier adapted to be subjected to the influence of a magnetic field and means for securing said sample carrier to said core.

References Cited in the file of this patent

UNITED STATES PATENTS

| 2,050,629 | Quereau et al. | Aug. 11, 1936 |

FOREIGN PATENTS

| 840,639 | Great Britain | July 6, 1960 |

OTHER REFERENCES

Griffiths: "Robust Helical Spring Microbalance," published in Journal of Scientific Instruments, vol. 38, pp. 463–65, December 1961.